United States Patent
Watanabe et al.

(10) Patent No.: US 7,681,463 B2
(45) Date of Patent: Mar. 23, 2010

(54) POWER STEERING SYSTEM FOR PROVIDING AN ENHANCED INDICATION OF ROAD CONDITIONS OR ROAD INFORMATION TO THE DRIVER

(75) Inventors: Daiji Watanabe, Kariya (JP); Motoaki Kataoka, Kariya (JP); Kunihiko Chiba, Kuwana (JP); Tomoyuki Hori, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/231,395

(22) Filed: Sep. 2, 2008

(65) Prior Publication Data
US 2009/0056474 A1 Mar. 5, 2009

(30) Foreign Application Priority Data
Sep. 3, 2007 (JP) .............................. 2007-228163

(51) Int. Cl.
*G01L 3/14* (2006.01)
*G01L 3/00* (2006.01)
*B62D 5/04* (2006.01)

(52) U.S. Cl. .............. 73/862.325; 180/446; 73/862.321

(58) Field of Classification Search ............ 73/862.193, 73/862.325, 862.331–862.336; 180/446
See application file for complete search history.

(56) References Cited

U.S. PATENT DOCUMENTS

| | | | | |
|---|---|---|---|---|
| 6,973,991 | B2 * | 12/2005 | Tokumoto et al. | 180/446 |
| 2005/0067214 | A1 * | 3/2005 | Tanaka et al. | 180/446 |
| 2005/0072622 | A1 * | 4/2005 | Satake et al. | 180/446 |
| 2006/0185928 | A1 * | 8/2006 | Yamazaki et al. | 180/446 |
| 2006/0259222 | A1 * | 11/2006 | Farrelly et al. | 180/446 |

FOREIGN PATENT DOCUMENTS

| | | |
|---|---|---|
| JP | 2003-327137 | 11/2003 |
| JP | 2005-043071 | 2/2005 |

OTHER PUBLICATIONS

Office Action dated Jun. 9, 2009 in the corresponding Japanese patent application No. 2007-228163 with English translation.

* cited by examiner

*Primary Examiner*—Lisa M Caputo
*Assistant Examiner*—Jonathan Dunlap
(74) *Attorney, Agent, or Firm*—Harness, Dickey & Pierce, PLC

(57) ABSTRACT

In an electric power assisting system for a vehicle, a control unit receives an input shaft rotation angle detected by an input shaft rotation angle sensor and an output shaft rotation angle detected by an output shaft rotation angle sensor. The control unit controls rotation of a motor based on the detected two rotation angles. The control unit differently controls the rotation of the motor whether torque is applied from a steering wheel side or from a road surface side.

4 Claims, 2 Drawing Sheets

POWER STEERING SYSTEM FOR PROVIDING AN ENHANCED INDICATION OF ROAD CONDITIONS OR ROAD INFORMATION TO THE DRIVER

CROSS REFERENCE TO RELATED APPLICATION

The present application relates to and incorporates herein by reference Japanese Patent Application No. 2007-228163 filed on Sep. 3, 2007.

FIELD OF THE INVENTION

The present invention relates to an electric power steering system for a vehicle.

BACKGROUND OF THE INVENTION

A conventional electric power steering system includes a torque sensor as exemplarily disclosed in JP 2005-43071A. The torque sensor is connected to an input shaft (steering shaft) and an output shaft (intermediate shaft) relatively rotatably through a torsion bar. The torque sensor includes an input shaft rotation angle sensor and an output shaft rotation angle sensor, which detect rotation angles of the input shaft and the output shaft, respectively. The torque sensor calculates a twist angle of the torsion bar as a difference between the input shaft rotation angle and the output shaft rotation angle, and applies the calculated twist angle of the torsion bar to a motor control unit. The motor control unit calculates a required steering assisting power based on the twist angle and drives the motor in a direction to reduce the twist of the torsion bar.

The conventional electric power steering system thus generates appropriate steering assisting power when the torsion bar is twisted by a steering wheel operated by a vehicle driver. The torsion bar is twisted by torque applied from not only an input shaft side but also an output shaft side. The torque applied from the input shaft side is generated by a steering wheel when the driver operates the steering wheel. The torque applied from the output shaft side is generated by road surface reactive force.

In the electric power steering system, only the twist angle calculated from the input shaft rotation angle and the output shaft rotation angle is applied to the motor control unit. Therefore it is not possible to check whether the torsion bar is twisted from the input shaft side (that is, torque application from the steering wheel side) or the output shaft side (that is, torque application from tire wheel side).

As a result, even when the torsion bar is twisted by toque applied from the output shaft side, the motor control unit drives the motor in a direction to reduce the amount of twist of the torsion bar. The transfer of reactive force from the road surface is thus limited, and hence the driver hardly senses the road surface condition based on the vibrating motion of the steering wheel.

SUMMARY OF THE INVENTION

It is therefore an object of the present invention to provide an electric power steering system, which operates differently depending on whether torque is applied to a torque sensor from an input shaft side or an output shaft side.

According to one aspect of the present invention, an electric power steering system for a vehicle has a torque sensor, a motor and a motor control unit. The torque sensor includes a torsion bar connecting an input shaft and an output shaft relatively rotatably, an input shaft rotation angle sensor for detecting an input shaft rotation angle indicative of a rotation angle of the input shaft, and an output shaft rotation angle sensor for detecting an output shaft rotation angle indicative of a rotation angle of the output shaft, the input shaft being coupled to the steering wheel and the output shaft being coupled to the steered wheels. The motor control unit is configured to control rotation of the motor based on at least two angles among three angles, which are the input shaft rotation angle, the output shaft rotation angle and a twist angle corresponding to a difference between the input shaft rotation angle and the output shaft rotation angle.

For example, the motor control unit determines, based on the two angles among the three angles, whether torque is applied to the torque sensor from an input shaft side or an output shaft side, and calculates a twist angle of the torsion bar based on the two angles. The motor control unit drives the motor in a direction to reduce twisting of the torsion bar thereby to generate steering assisting power, when the torque is determined as being applied from the input shaft side. The motor control unit drives the motor to in a direction to increase twisting of the torsion bar or stops rotation of the motor thereby to transfer the torque applied from the output shaft side to the input shaft side, when the torque is determined as being applied from the output shaft side.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
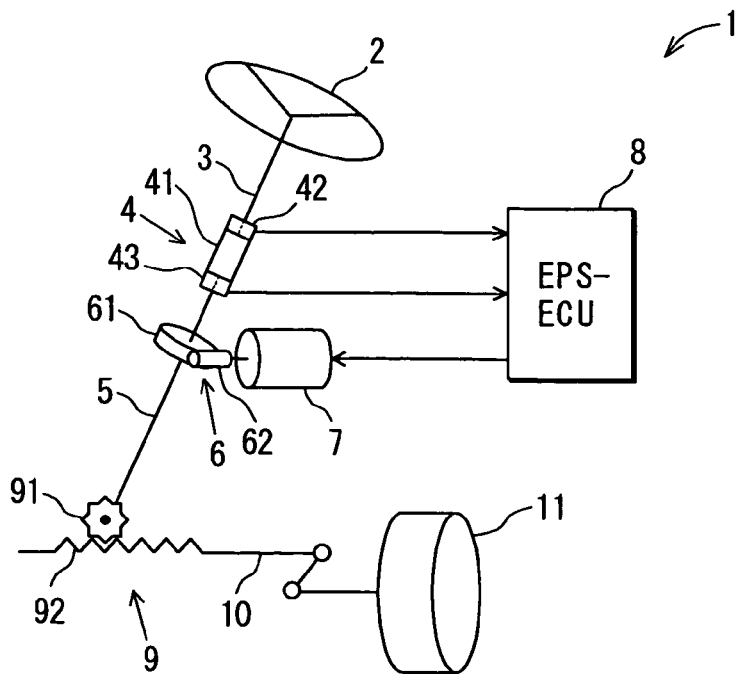
FIG. 1 is a schematic diagram showing an electric power steering system according to an embodiment of the present invention.

Referring first to FIG. 1 showing an electric power steering system 1 for a vehicle, a steering wheel 2 is fixed to one end of an input shaft (steering shaft) 3 so that the steering wheel 2 and the input shaft 3 rotate together. The other end of the input shaft 3 is fixed to a torque sensor 4, specifically a torsion bar 41. The torsion bar 41 connects the input shaft 3 provided at its input side and an output shaft (intermediate shaft) 5 provided at its output side.

The torque sensor 4 is a conventional sensor, which has an input shaft rotation angle sensor 42 and an output shaft rotation angle sensor 43. The rotation angle sensor 42 detects a rotation angle (input shaft rotation angle) of the input shaft 3, and the rotation angle sensor 43 detects a rotation angle (output shaft rotation angle) of the output shaft 5. The rotation angle sensors 42 and 43 use resolvers, but may use other conventional rotation angle sensors.

The output shaft 5 is fixed to a reduction gear set 6, which includes a reduction gear 61 and a pinion gear 62. The output shaft 5 is fixed to the reduction gear 61, which may be a helical gear. The reduction gear 61 is engaged with the pinion gear 62.

The pinion gear 62 is fixed to a rotation shaft of an electric motor 7 to rotate with the rotation shaft. The rotation of the motor 7 is reduced by the reduction gear set 6 and transferred to the output shaft 5.

The motor 7 is connected to an electric power steering electronic control unit (EPS-ECU) 8 to be controlled thereby. Detection signals of the rotation angle sensors 42 and 43 of the torque sensor 4 indicating the input shaft rotation angle and the output shaft rotation angle are applied to the ECU 8, respectively. The ECU 8 is configured or programmed to control rotation of the motor 7 based on these detection signals. The ECU 8 may receive other detection signals indicative of vehicle travel speed, steering wheel rotation angle or the like in addition to the detection signals of the torque sensor 4, and control the motor 7 by also using these other detection signals.

The output shaft 5 is fixed to a gear set 9, which includes a pinion gear 91 and a rack 92. The pinion gear 91 is rotatable with the output shaft 5 integrally. The rack 92 is fixed to a rack rod 10, which extends laterally, that is, in the width direction of a vehicle, and is coupled with steered wheels (tire wheels) 11 of the vehicle through a link.

Figure 2:
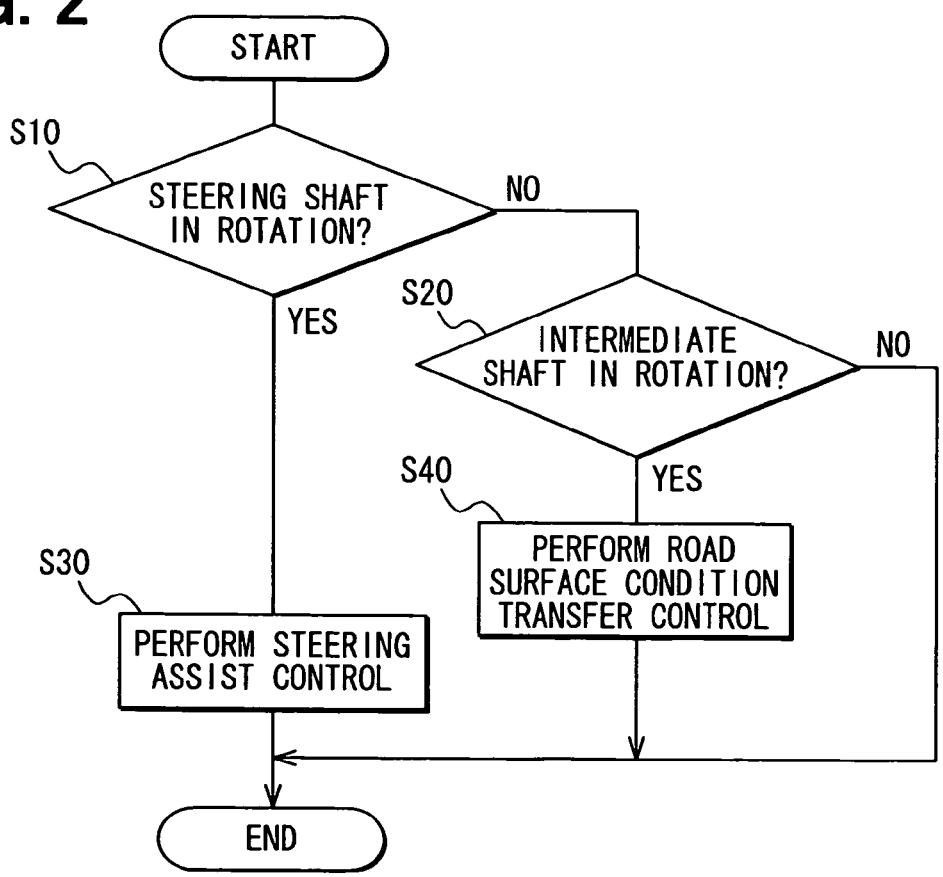
FIG. 2 is a flowchart showing motor control processing executed by a motor control unit in the embodiment.

The ECU 8 is configured or programmed to execute motor control processing as shown in FIG. 2. This processing is executed repeatedly at every predetermined interval.

It is first checked at S10 whether the input shaft 3 is in rotation (rotating motion) based on the detection signal of the input shaft rotation angle sensor 42. If the input shaft 3 is not and is in rotation, S20 and S30 are executed, respectively.

At S20, it is determined whether the output shaft 5 is in rotation (rotating motion) based on the detection signal of the output shaft rotation angle sensor 43. If the output shaft 5 is not in rotation, the motor control processing is terminated. If the output shaft 5 is in rotation, S40 is executed.

By S10 and S20, the ECU 8 checks whether torque is applied to the torque sensor 4 from the input shaft side or the output shaft side, and determines a direction of application of torque.

At S30, steering assisting control is performed in generally the same manner as in the conventional steering assisting control. For example, the motor 7 is driven to generate steering assisting power based on the twist angle of the torsion bar 41.

Specifically, in S30, the twist angle is calculated as a difference between the rotation angles of the shafts 3 and 5 detected by the rotation angle sensors 41 and 43, respectively. The torque applied to the torsion bar 41 is calculated based on the calculated twist angle and a pre-stored spring constant of the torsion bar 41. A target torque required for the motor 7 to generate for steering assisting is determined based on the calculated applied torque by referring to a data map defining a relation between applied steering torque and required assisting torque. The motor 7 is then driven to actually generate the required target torque by feedback-controlling a motor current. The steering assisting torque is for assisting torque which the vehicle driver applied to the input shaft 3 through the steering wheel 2. Therefore, in this steering assisting control, the motor 7 is driven to rotate in a direction to reduce the amount of twist of the torsion bar 41.

The road surface condition transfer control is performed at S40, only when S10 is NO (input shaft 3 is not in rotation) but S20 is YES (output shaft 5 is in rotation). Under this condition, the output shaft 5 is rotated by the reactive force of the road surface.

In the road surface condition transfer control, the motor 7 is driven to rotate the output shaft 5 in the same direction as the direction in which the output shaft 5 is rotated by the reactive force of the road surface. When the motor 7 is thus driven, the torsion bar 41 is twisted more and hence the reactive force of the road surface is transferred to the steering wheel 2 more noticeably.

In this instance, the amount of motor control (amount of rotation of the output shaft 5 caused by the rotation of the motor 7) may be determined variably based on the rotation speed of the output shaft 5 or may be fixed to a predetermined amount. The amount of motor control may alternatively determined by calculating the torque applied to the torque sensor 4 based on the twist angle of the torsion bar 41 in the same manner as in the steering assisting control of S30.

According to the present embodiment, when the steering wheel 2 is operated by the driver, the steering assisting control is performed (S30). In addition, when the torsion bar 41 is twisted by the reactive force of the road surface under the condition that the steering wheel 2 is not operated, the motor 7 is controlled differently in the road surface condition transfer control. That is, the motor 7 is driven to twist the torsion bar 41 more than being twisted by the reactive force of the road surface. As a result, the reactive force of the road surface can be more noticeably transferred to the steering wheel 2.

The torque transfer characteristic of the present embodiment is compared with that of the conventional system, in which the direction of application of torque is not checked and the steering assisting control is performed irrespective of the direction of application of torque.

Figure 3A:
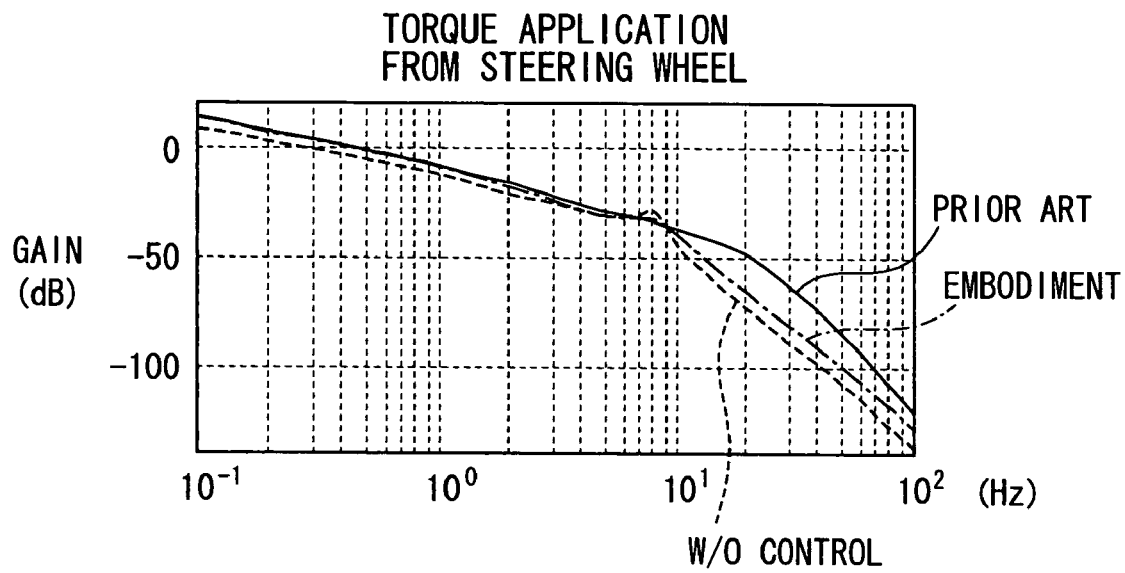
FIGS. 3A and 3B are bode diagrams showing torque transfer characteristics under conventional control, present control and no control in cases of application of torque from an input shaft side and an output shaft side, respectively.
Figure 3B:
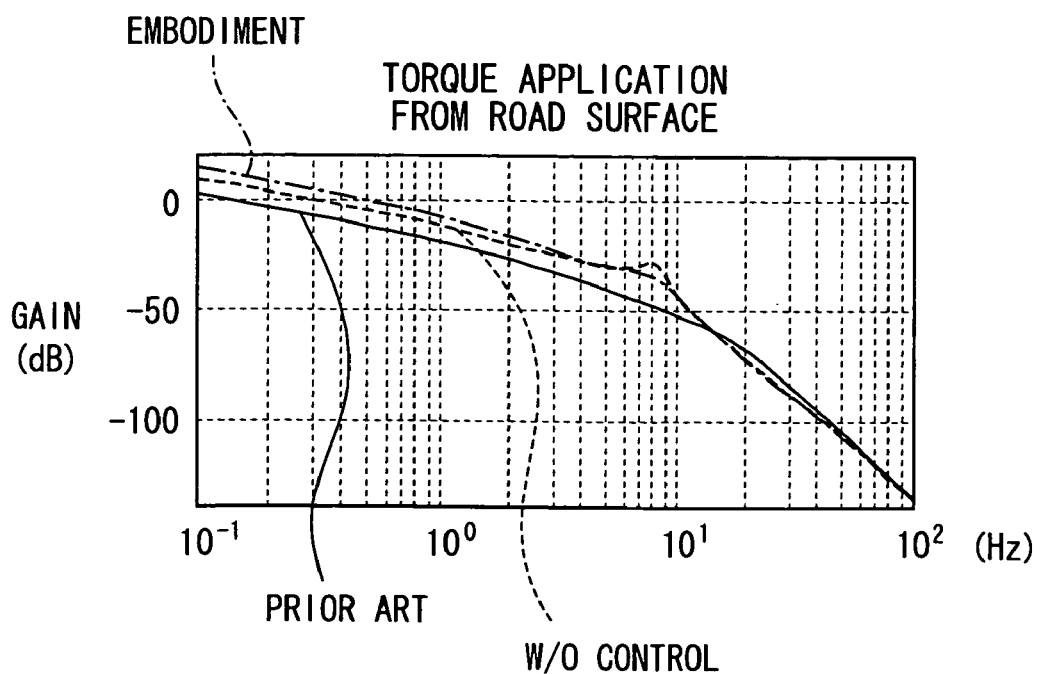

In FIGS. 3A and 3B, the characteristics of the conventional control (prior art), and the present control (embodiment) and no control are indicated by solid liens, dot-chain lines and dot lines, respectively. FIG. 3A and FIG. 3B show cases where the torque is applied from the steering wheel 2 to the torsion bar 4 through the input shaft 3 and the torque is applied from the road surface through the output shaft 5, respectively.

As shown in FIG. 3A, when the torque is applied from the steering wheel 2, the gain (assisting power) of the conventional control is greater than no control over an entire frequency range. The present control has generally the same gain characteristic as the conventional control in the frequency range of less than 10 Hz, in which the steering wheel 2 is normally operated. Therefore, according to the present embodiment, the driver is allowed to operate the steering wheel 2 with the similar steering force as in the conventional control.

As shown in FIG. 3B, however, when the torque is applied from the road surface, the gain in the conventional control is less than that of the no control in the frequency range less than 10 Hz. This is because the direction of torque applied to the torsion bar 4 is not determined nor taken into control. The conventional control cannot thus transfer the torque applied from the road surface to the steering wheel 2.

According to the present control, the direction of torque application is determined and taken into control. Therefore, when the torque is applied from the road surface, the gain of the present control is made higher than that of both of the conventional control and no control in the frequency range of less than 10 Hz. Thus, by the present control, the torque applied from the road surface can be transferred to the steering wheel 2 more noticeably. As a result, the driver is enabled to operate the steering wheel 2 appropriately while noticing the road surface conditions based on vibrating motion or the like of the steering wheel 2.

The present invention is not limited to the above embodiment, but may be implemented in many other ways.

For instance, in the road surface condition transfer control (S40), the rotation of the motor 7 may be stopped in place of driving the motor 7 in the direction to twist the torsion bar 41 more. With this control, the torque from the road surface can be transferred to the steering wheel 2 more noticeably than in the conventional system.

In the road surface transfer condition control (S40), the rotation of the motor 7 may be controlled to reduce the amount of reduction of twist of the torsion bar 41 to be less than in the power assisting control (S30). In this instance, in the similar manner as in the steering assisting control (S30), the torque applied to the torsion bar 41 may be calculated based on the twist angle of the torsion bar 41, and a target torque less than that of the steering assisting control (S30) may be determined based on the calculated torque. Thus, the torque applied from the road surface can be transferred to the steering wheel 2 more noticeably than in the conventional system.

The direction of rotation of the motor 7 in the road surface condition transfer control may be selectively determined by a user to the same direction as the steering assisting control, to the opposite direction from the steering assisting control or stopping of the rotation of the motor 7. The amount of control of the motor 7 relative to the torque applied to the torsion bar 41 may be set by a driver variably, so that the steering operation can match driver's preference.

In the steering assisting control (S30), the target torque which the motor 7 is required to generate may be determined based on an input shaft rotation angle in place of the twist angle of the torsion bar 41. Further, the rotation of the motor 7 may be controlled by a sum of two control amounts calculated from the twist angle. One control amount is calculated based on the input shaft rotation angle to correspond to an amount of rotation of the torsion bar 41 caused by the application of torque from the steering wheel 2, and the other control amount is calculated based on the output shaft rotation angle to correspond to an amount of rotation of the torsion bar 41 caused by the application of torque from the road surface.

What is claimed is:

1. An electric power steering system for a vehicle having a steering wheel and steered wheels, the system comprising:
    a torque sensor including a torsion bar connecting an input shaft and an output shaft relatively rotatably, an input shaft rotation angle sensor for detecting an input shaft rotation angle indicative of a rotation angle of the input shaft, and an output shaft rotation angle sensor for detecting an output shaft rotation angle indicative of a rotation angle of the output shaft, the input shaft being coupled to the steering wheel and the output shaft being coupled to the steered wheels;
    a motor for generating steering assisting power; and
    a motor control unit configured to control rotation of the motor based on at least two angles among three angles, which are the input shaft rotation angle, the output shaft rotation angle and a twist angle corresponding to a difference between the input shaft rotation angle and the output shaft rotation angle;
    wherein the motor control unit includes:
    torque direction determination means for determining, based on the two angles among the three angles, whether torque is applied to the torque sensor from an input shaft side or an output shaft side;
    assist control means for calculating a twist angle of the torsion bar based on the two angles and driving the motor in a direction to reduce twisting of the torsion bar thereby to generate steering assisting power, when the torque is determined as being applied from the input shaft side; and
    transfer control means for driving the motor to reduce an amount of reducing the twist of the torsion bar to be less than an amount of reducing the twist of the torsion provided by the assist control means, so that the torque applied from the output shaft side is transferred to the steering wheel, when the torque is determined as being applied from the output shaft side; wherein
    the transfer control means is configured to drive the motor in a direction to increase the twist of the torsion bar, when the torque is determined as being applied from the output shaft side.

2. The electric power steering system according to claim 1, wherein the motor control unit is configured to control the rotation of the motor based on the input shaft rotation angle and the output shaft rotation angle.

3. The electric power steering system according to claim 1, wherein:
    the torque direction determination means is configured to determine that the torque is applied from the output shaft side, when the output shaft side is rotated and the input shaft side is not rotated.

4. An electric power steering system for a vehicle having a steering wheel and steered wheels, the system comprising:
    a torque sensor including a torsion bar connecting an input shaft and an output shaft relatively rotatably, an input shaft rotation angle sensor for detecting an input shaft rotation angle indicative of a rotation angle of the input shaft, and an output shaft rotation angle sensor for detecting an output shaft rotation angle indicative of a rotation angle of the output shaft, the input shaft being coupled to the steering wheel and the output shaft being coupled to the steered wheels;
    a motor for generating steering assisting power; and
    a motor control unit configured to control rotation of the motor based on at least two angles among three angles, which are the input shaft rotation angle, the output shaft rotation angle and a twist angle corresponding to a difference between the input shaft rotation angle and the output shaft rotation angle,
    wherein the motor control unit includes
    means for determining, based on the two angles among the three angles, whether torque is applied to the torque sensor from an input shaft side or an output shaft side;
    means for calculating a twist angle of the torsion bar based on the two angles;
    means for driving the motor in a direction to reduce twisting of the torsion bar thereby to generate steering assisting power, when the torque is determined as being applied from the input shaft side, and
    means for driving the motor in a direction to increase the twist of the torsion bar in a direction to transfer torque applied from a road to the steering wheel, when the torque is determined as being applied from the output shaft side.

* * * * *